UNITED STATES PATENT OFFICE.

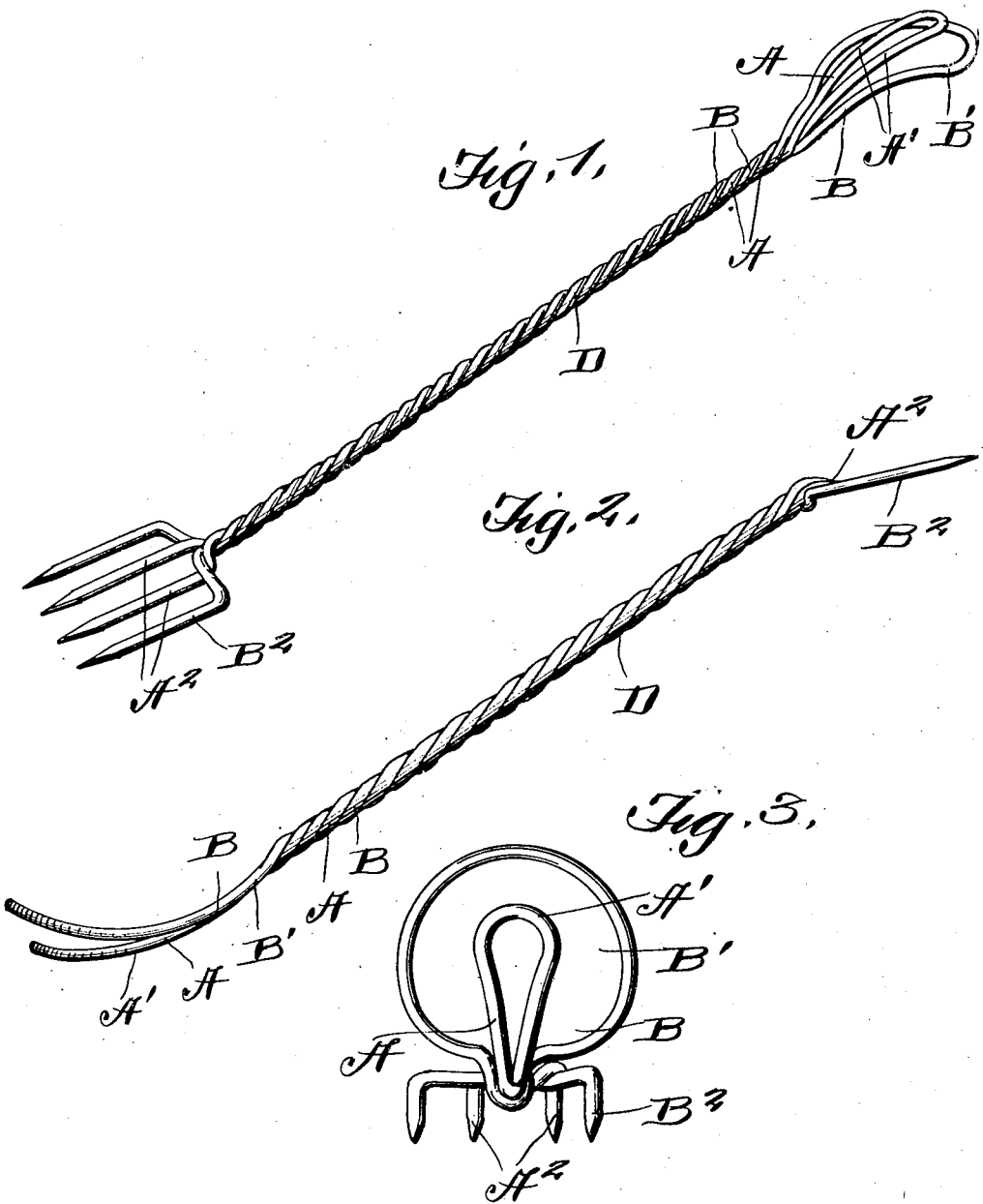

HARVEY J. VASCONCELLES, OF JACKSONVILLE, ILLINOIS.

COMBINED FORK, EGG-BEATER, AND DISH-LIFTER.

No. 865,620.　　　　　　Specification of Letters Patent.　　　　Patented Sept. 10, 1907.

Application filed July 30, 1907. Serial No. 386,287.

To all whom it may concern:

Be it known that I, HARVEY J. VASCONCELLES, a citizen of the United States, residing at Jacksonville, in the county of Morgan and State of Illinois, have invented certain new and useful Improvements in a Combined Fork, Egg-Beater, and Dish-Lifter; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in combination tools and consists in the provision of a fork made up of two strands of wire which are twisted together to form a shank portion, while the ends of the wire form a fork, the portions of the wire which are bent upon themselves being formed into an egg beater, device for lifting kettles, pans, boiled eggs, etc.

The invention consists further in various details of construction and combinations and arrangements of parts which will be hereinafter fully described and then specifically defined in the appended claims.

I illustrate my invention in the accompanying drawings, in which:—

Figure 1 is a perspective view of my invention. Fig. 2 is an edge view, and Fig. 3 is an end elevation.

Reference now being had to the details of the drawings by letter, A and B designate two wires which are bent upon themselves, preferably at their longitudinal centers, forming the two loops A' and B' respectively, the loop A' being formed from the wire A and the loop B' from the wire B. The ends of the wire A form the inner tines $A^2$ and the ends of the wire B form the outer tines $B^2$, which tines are arranged preferably as shown in the drawings. The two wires are twisted together to form the shank D of the handle. The loop A' which is formed out of the wire A is narrower than the loop B' and is positioned between the marginal edge of the loop B' and may be utilized for a lid lifter by its being positioned so that the edge of a dish may be inserted between the two loops. Said loop A' also forms a bottom for coöperating with the loop B', serving as a means for lifting boiled eggs, for beating eggs, etc.

It will be noted upon reference to the edge view of the device that said loops are concaved longitudinally for the purpose of making a convenient apparatus for any purpose for which the loops may be employed.

From the foregoing it will be noted that, by the provision of the device as shown and described, a simple and efficient means is afforded whereby the article may be utilized for the various purposes set forth.

What I claim to be new is:—

A combination tool comprising two pieces of wire which are bent upon themselves to form loops of different sizes, one of the loops being flaring and the other loop positioned between the marginal edge of the flaring loop and extending slightly below the latter, the strands of the wire being twisted together to form a handle, and the ends of the wire being formed into tines of a fork, as set forth.

In testimony whereof I hereunto affix my signature in the presence of two witnesses.

HARVEY J. VASCONCELLES.

Witnesses:
　JOHN H. RUSSELL,
　R. I. DUNLAP.